United States Patent [19]

Quirk

[11] 4,201,244
[45] May 6, 1980

[54] AUXILIARY SAFETY VALVE FOR A PRESSURIZED FLUID SYSTEM

[76] Inventor: Leo Quirk, Box 84, Mountain Iron, Minn. 55768

[21] Appl. No.: 930,708

[22] Filed: Aug. 3, 1978

[51] Int. Cl.² .................. F16K 15/18; F16K 15/04
[52] U.S. Cl. ....................... 137/614.2; 137/519.5; 137/462
[58] Field of Search .......... 137/519.5, 513.7, 614.2, 137/462; 222/545

[56] References Cited

U.S. PATENT DOCUMENTS

| | | | |
|---|---|---|---|
| 2,635,626 | 4/1953 | Meying | 137/462 |
| 2,638,308 | 5/1953 | Kell | 137/519.5 |
| 3,683,597 | 8/1972 | Sands | 137/462 |
| 3,850,191 | 11/1974 | Brown | 137/519.5 |
| 4,040,441 | 8/1977 | Brown | 137/519.5 |
| 4,049,015 | 9/1977 | Brown | 137/519.5 |
| 4,120,315 | 10/1978 | Snyder | 137/519.5 |
| 4,810,203 | 8/1978 | Brown | 137/519.5 |

FOREIGN PATENT DOCUMENTS

| | | | |
|---|---|---|---|
| 1020504 | 12/1957 | Fed. Rep. of Germany | 137/513.7 |
| 520157 | 3/1955 | Italy | 137/614.2 |
| 544834 | of 1956 | Italy | 137/614.2 |

*Primary Examiner*—Martin P. Schwadron
*Assistant Examiner*—A. Michael Chambers
*Attorney, Agent, or Firm*—Wicks & Nemer

[57] ABSTRACT

An auxiliary safety valve for interposition in a pressurized fluid system including a cylindrical valve body having threads for connecting the valve body to the outlet end of a pressurized container for communication therewith. The valve body has a main bore adapted to align with the outlet end of a pressurized container and an auxiliary bore formed at an acute angle to the main bore and joining with the main bore. A ball seat is formed substantially where the auxiliary bore joins the main bore, and a ball mounted in the auxiliary bore for movement therein and to said ball seat to close off the main bore when the pressure flow through the main bore exceeds a predetermined level of flow together with threads on the valve body for connecting the valve body to an outlet control valve for communication therewith.

The valve body also includes a conduit with a valve control therefor which bypasses the auxiliary valve for equalizing pressure within the container and at a point outwardly of the auxiliary valve.

1 Claim, 3 Drawing Figures

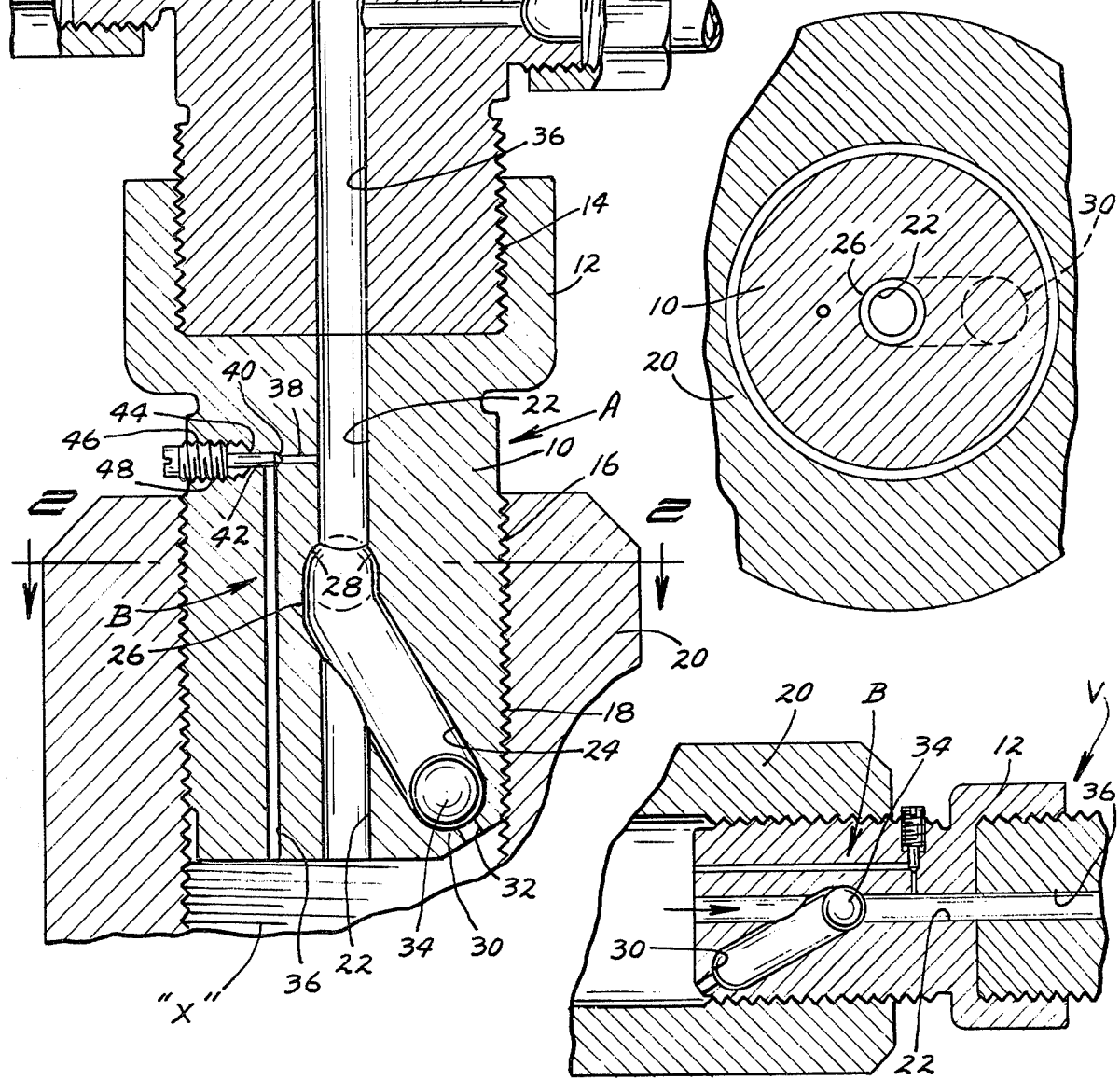

AUXILIARY SAFETY VALVE FOR A PRESSURIZED FLUID SYSTEM

SUMMARY

The invention relates broadly to outlet valves used on pressurized containers and more particularly to an auxiliary valve which closes off the outlet valve when the outlet valve is damaged or malfunctioning and is allowing the full and uncontrolled dangerous escape of pressure from the container.

It is an object of the invention to provide an auxiliary safety valve which is simply and easily interposed between the conventional outlet valve and the neck of a pressurized container. It is a further object of the invention to provide an auxiliary safety valve which is automatically actuated to close off the escape of a gas from a container when the outlet valve is damaged or is malfunctioning or when there is a break in a pressurized line leading from a pressurized container. It is also an object to provide means for selectively equalizing pressure within the container and at a point outwardly of the auxiliary valve whereby the auxiliary valve is returned from an operative condition to a non-operative condition.

The invention will appear more clearly from the following detailed description when taken in connection with the accompanying drawings, showing by way of example a preferred embodiment of the inventive idea wherein like numerals refer to like parts throughout.

In the drawings forming part of this application:

FIG. 1 is a longitudinal sectional view through an auxiliary safety valve embodying the invention and shown mounted on the end of a pressurized tank with a conventional outlet valve shown as mounted on the auxiliary safety valve.

FIG. 2 is a sectional view on the line 2—2 of FIG. 1.

FIG. 3 is a sectional view auxiliary safety valve in operative position.

Referring to the drawings in particular, the auxiliary safety valve A includes the cylindrical valve body portion 10 which terminates in the enlarged upper end portion 12. The end portion 12 is formed with the circular threaded recess 14. The external surface of the body portion 10 is threaded as at 16 which is engaged with the threads 18 of the neck 20 of a pressurized container not shown.

The valve body portion 10 has formed therethrough the longitudinally extending axial main bore 22. Also formed in the body portion 10 is the short auxiliary bore 24 which is angularly disposed to and in communication with the main bore 22. The short auxiliary bore 24 has a slightly larger diameter than that of the bore 22 as it terminates at a short enlarged bore portion 26 which is axially aligned with and forms part of the bore portion 22. The short enlarged bore portion 26 is formed intermediate the ends of the bore 22. The bore 26 at its upper end where it joins with the bore portion 22 terminates in the annular ball seat 28. The lower end of the short auxiliary bore 24 terminates in the half spherical ball seat 30. At the bottom of the valve seat 30 is formed the egress hole 32. The numeral 34 designates a ball check which is positioned within the short conduit and normally rests on the ball seat 30.

With the main bore 22 axially disposed relative to the enlarged upper end portion 12, the bore aligns with the bore 36 of the conventional outlet control valve V used on a conventional oxygen container as an example of use of the invention. The size of the ball 34 and the diameter of the auxiliary bore 24 is calibrated relative to the pressure to be carried in a given container on which the auxiliary valve is used.

The letter B designates a bleed or equalizer system for repositioning the valve check ball 34 upon the seat 30 of auxiliary bore 24, and the same includes the conduit 37 which is formed internally of the body portion 10 beginning at the lower end where it communicates with interior of the neck 20 of a pressurized container not shown. The conduit 37 leads to a transverse conduit 38 which communicates with the bore 22 at a point intermediate the ball seat 28 and the upper end of the valve body portion 10. The outer end of the transverse conduit 38 is formed with the valve seat 40 which is engageable by the conical end 42 of the valve 44. The valve 44 includes the threaded head 46 which engages threads formed in the recess 48 which is in axial alignment with the seat 40 and the conduit 38. With the end 40 of the valve 44 retracted off the valve seat 40, the interior of the containter tank as at "X" communicates with the bore 22 at the upper end of the body portion 10 which relieves pressure on the ball when it is upon seat 28, and it follows that when the valve 44 is closed upon the seat 42 there is no such communication.

OPERATION

The auxiliary safety valve A operates in the following manner: In the event the valve V is broken off or becomes defective so as to release uncontrolled pressure from the container it is connected to by means of the valve A, the flow out of the container is at a greater rate than through the control valve V whereby the outward pressure flow causes the ball 34 to automatically and instantaneously unseat from the seat 30 and travel to the seat 28 and thereby close off the bore 22. As a result the escape of highly dangerous fluid or gas is stopped. When a gas or fluid does escape from a pressurized container without control, the container may move wildly about and/or hoses attached thereto flip wildly about with great danger to persons near the container and hoses.

With the valve A installed on a pressurized container system used in sandblasting a broken hose would actuate the valve A and thereby shut off the air pressure which prevents the hose and sand from whipping about.

A pressurized supply container must be operated in an upright position. With the valve A used on a container, and the container placed in a horizontal position, the ball 34 will automatically travel to the valve seat 28 and shut off the pressure thereby making use of the container in a horizontal position impossible. The ball 34 may be manually actuated by inserting a small rod through the egress hole 32 to unseat the ball.

When the ball has been caused to seat on the seat 28, pressure is greater on the down side of the ball than on the up side. With the ball on the seat 28, the same may be removed from the seat 28 by use of the bleed or equalizer system B. The head 46 is unscrewed so that the valve end 42 is unseated from the valve seat 40 which allows the pressure to be equalized on both sides of the ball, and as a result, the ball will fall back onto the seat 30. The screw head 46 may also be used to bleed air out of the bank at a controlled rate if desired.

Having thus described the invention, what is claimed as new and desired to be secured by Letters Patent is:

1. An auxiliary safety valve for interposition in a pressurized container system comprising:
   (a) a cylindrical valve body,
   (b) means for connecting said valve body to the outlet end of a pressurized container for communication therewith,
   (c) said valve body having a main bore extending therethrough adapted to align with the outlet end of a pressurized container and in communication with said outlet end pressure,
   (d) said valve body having an auxiliary bore formed therein at an acute angle to said main bore and in communication with said outlet end pressure and joining with said main bore and in communication therewith,
   (e) a ball seat formed substantially where said auxiliary bore joins said main bore,
   (f) said auxiliary bore having a valve seat formed therein,
   (g) said valve seat having a restricted passage restricted in size relative to the size of the auxiallary bore formed therein and in communication with said outlet end pressure,
   (h) a ball mounted in said auxiliary bore for movement therein and to said ball seat to close off said main bore due to pressure through said restricted passage when the pressure through said main bore exceeds a predetermined value and
   (i) means for connecting said valve body to an outlet control valve for communication therewith,
   (j) said valve body having a conduit extending from the pressurized container out end and in communication with said outlet end pressure and terminating at and in communication with said main bore at a point intermediate said ball seat and the control valve
   (k) valve means for opening and closing said conduit whereby pressure may be reduced in said restricted passage whereby said ball may be moved from said ball seat to said valve seat to allow said main bore to reopen.

* * * * *